(12) United States Patent
Lee et al.

(10) Patent No.: US 8,114,173 B2
(45) Date of Patent: Feb. 14, 2012

(54) HYDROGEN GENERATOR AND METHOD OF OPERATING THE SAME

(75) Inventors: Dong-Woo Lee, Yongin-si (KR);
Tae-sang Park, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 941 days.

(21) Appl. No.: 11/692,533

(22) Filed: Mar. 28, 2007

(65) Prior Publication Data
US 2008/0090112 A1 Apr. 17, 2008

(30) Foreign Application Priority Data
Oct. 13, 2006 (KR) .................. 10-2006-0100012

(51) Int. Cl.
*B01J 7/00* (2006.01)
*H01M 8/06* (2006.01)
*C01B 3/36* (2006.01)
*C01B 6/24* (2006.01)
*C01B 3/02* (2006.01)
*C10J 3/54* (2006.01)

(52) U.S. Cl. ......... 48/61; 48/197 R; 423/644; 423/648.1
(58) Field of Classification Search .......... 48/61, 197 R; 423/644, 648.1
See application file for complete search history.

(56) References Cited

U.S. PATENT DOCUMENTS

| | | | | |
|---|---|---|---|---|
| 6,162,267 A * | 12/2000 | Priegnitz et al. | ......... | 48/199 FM |
| 7,037,472 B2 * | 5/2006 | Komiya et al. | ................ | 422/197 |
| 2002/0114747 A1 * | 8/2002 | Marchand et al. | ............ | 422/198 |
| 2004/0005249 A1 * | 1/2004 | Arends et al. | ................. | 422/173 |
| 2005/0227129 A1 * | 10/2005 | Iio | ................................. | 429/20 |

* cited by examiner

*Primary Examiner* — Matthew Merkling
(74) *Attorney, Agent, or Firm* — Lee & Morse, P.C.

(57) ABSTRACT

A hydrogen generator and a method of operating the hydrogen generator. The hydrogen generator includes: a cylindrical reformer catalyst; and a cylindrical shift catalyst disposed inside of the reformer catalyst; a separation wall provided between the reformer catalyst and the shift catalyst; a cylinder that is disposed inside of the reformer catalyst, and comprises, on an outer surface thereof, a plurality of first nozzles to direct a plurality of flames to the reformer catalyst and a plurality of second nozzles to direct a plurality of flames to the shift catalyst; and a combustion fuel supply valve that selectively guides a combustion fuel to the first nozzles and or the second nozzles. The method includes heating the shift catalyst by supplying a combustion fuel to the second nozzles, making flames by igniting the combustion fuel that passes through the second nozzles, and directing the flames towards the shift catalyst, and stopping the heating of the shift catalyst by blocking the supply of the combustion fuel to the second nozzles when the temperature of the shift catalyst reaches the shift reaction temperature.

15 Claims, 6 Drawing Sheets

HYDROGEN GENERATOR AND METHOD OF OPERATING THE SAME

CROSS-REFERENCE TO RELATED APPLICATIONS

This application claims the benefit of Korean Application No. 2006-100012, filed Oct. 13, 2006, in the Korean Intellectual Property Office, the disclosure of which is incorporated herein by reference.

BACKGROUND OF THE INVENTION

1. Field of the Invention

Aspects of the present invention relate to an apparatus for a fuel processor of a fuel cell system, and more particularly, to a hydrogen generator included in a fuel processor, and a method of operating the same.

2. Description of the Related Art

A fuel cell is an electricity generation system that transforms chemical energy directly into electrical energy, through a chemical reaction between oxygen and hydrogen contained in a hydrocarbon group material, such as, methanol, ethanol, or natural gas. Fuel cell systems can be largely divided into fuel cell systems that use liquid hydrogen and fuel cell systems that use hydrogen gas. Fuel cell systems that use hydrogen gas include fuel cell stacks and fuel processors. Fuel cell stacks have a structure in which a few to a few tens of unit cells, each composed of a membrane electrode assembly (MEA) and a separator, are stacked together.

FIG. 1 is a block diagram showing a configuration of a conventional fuel cell system.

Referring to FIG. 1, a hydrogen-containing power generation fuel is reformed into hydrogen gas in a fuel processor, and the hydrogen gas is supplied to a fuel cell stack. In the fuel cell stack, electrical energy is generated through an electrochemical reaction between the hydrogen gas and oxygen.

The fuel processor includes a desulfurizer and a hydrogen generator. The hydrogen generator includes a reformer and a shift reactor. The desulfurizer removes sulfur from the power generation fuel to prevent catalysts in the reformer and the shift reactor from being poisoned by sulfur compounds.

Hydrogen gas is generated from hydrocarbons in the reformer, but in addition to the hydrogen gas, carbon dioxide ($CO_2$) and carbon monoxide (CO) are also produced. The CO acts as a poison to the catalysts used on the electrodes of the fuel cell stack. Therefore, the hydrogen gas generated in the reformer is not directly supplied to the fuel cell stack, but is supplied only after the CO is removed in the shift reactor. Conventionally, the hydrogen gas that has passed through the shift reactor has a CO content of 10 ppm, or less.

In order to remove CO, a shift reaction, a methanation reaction, and a PROX reaction, as shown below in Reactions 1 through 3 respectively, occur in the shift reactor.

[Reaction 1]

[Reaction 2]

[Reaction 3]

In order to reduce the CO content in the hydrogen gas to 10 ppm or less, using the reactions, the shift reactor must be heated to 200 to 250° C. However, in a conventional hydrogen generator, it takes more than one hour to increase the temperature of the shift reactor to 200° C. or more, using an indirect heating method. Waiting one hour or more to use electrical energy generated from a fuel cell can be a serious drawback in using such a fuel cell system. Therefore, there is a need to improve the heating method.

To solve the above problem, a method of heating the shift reactor using an additional electric heater has been disclosed in Japanese Patent Publication No. 2001-354404. However, the large consumption of electrical energy inherent in the taught method, due to the use of an electric heater, reduces the efficiency of the electrical energy generation.

SUMMARY OF THE INVENTION

Aspects of the present invention provide a hydrogen generator, in which not only a reformer catalyst but also a shift catalyst can be directly heated and a method of operating the hydrogen generator.

Aspects of the present invention also provide a hydrogen generator, that has a compact arrangement of the reformer and the shift catalysts, and has a reduced time requirement for a shift reactor to increase its temperature to a shift reaction temperature, The present teachings also include a method of operating the hydrogen generator.

According to an aspect of the present invention, there is provided a hydrogen generator comprising: a cylindrical reformer catalyst; a cylindrical shift catalyst disposed around the catalyst; a separation wall provided between the reformer catalyst and the shift catalyst; a cylinder disposed on the inside of the reformer catalyst, comprising on an outer surface thereof a plurality of first nozzles, to direct a flame towards the reformer catalyst, and a plurality of second nozzles, to direct a flame towards the shift catalyst; and a combustion fuel supply valve that selectively guides a combustion fuel to the first nozzles and/or the second nozzles.

The separation wall may be formed of an adiabatic material.

The hydrogen generator may comprise a combustion fuel supply hole in the cylinder, to direct the combustion fuel into the cylinder. The combustion fuel supply hole is located closer to the second nozzles than the first nozzles. The combustion fuel supply valve is disposed between the first nozzles and the second nozzles, within the cylinder.

The combustion fuel supply valve may comprise a first block that can block the combustion fuel from being supplied to the first nozzles, and a second block that is connected to the same axis as the first block, and can block the combustion fuel from being supplied to the second nozzles. The combustion fuel supply valve is configured to move to: a first position, in which the supply of the combustion fuel to the first nozzles is blocked by the first block, but the supply of the combustion fuel to the second nozzles is allowed; a second position, in which the supply of the combustion fuel to the second nozzles is blocked by the second block, but the supply of the combustion fuel to the first nozzles is allowed; and a third position, in which the supply of the combustion fuel to both the first nozzles and the second nozzles is allowed.

The hydrogen generator may further comprise an inner heat exchanger within the cylinder, to vaporize a power generation fuel supplied to the inside of the cylinder.

The reformer catalyst may be arranged to face all of the first nozzles.

The second nozzles may be disposed on a lower portion of the outer perimeter of the cylinder, and the first nozzles can be disposed at an upper portion of the outer perimeter of the cylinder, that is higher than the second nozzles.

According to an aspect of the present invention, there is provided a method of operating the hydrogen generator, comprising: heating a shift catalyst by supplying a combustion fuel to second nozzles, making flames by igniting the combustion fuel that passes through the second nozzles, and directing the flames towards the shift catalyst; and stopping the heating of the shift catalyst by blocking the supply of the combustion fuel to the second nozzles, when the temperature of the shift catalyst reaches a shift reaction temperature.

The shift reaction temperature may be about 200 to 250° C.

The method may further comprise heating a reformer catalyst by supplying the combustion fuel to the first nozzles, making flames by igniting the combustion fuel that passes through the first nozzles, and directing the flames to the reformer catalyst.

The heating of the shift catalyst may start prior to the heating of the reformer catalyst, or the heating of the shift catalyst and the reformer catalyst may be simultaneously started.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
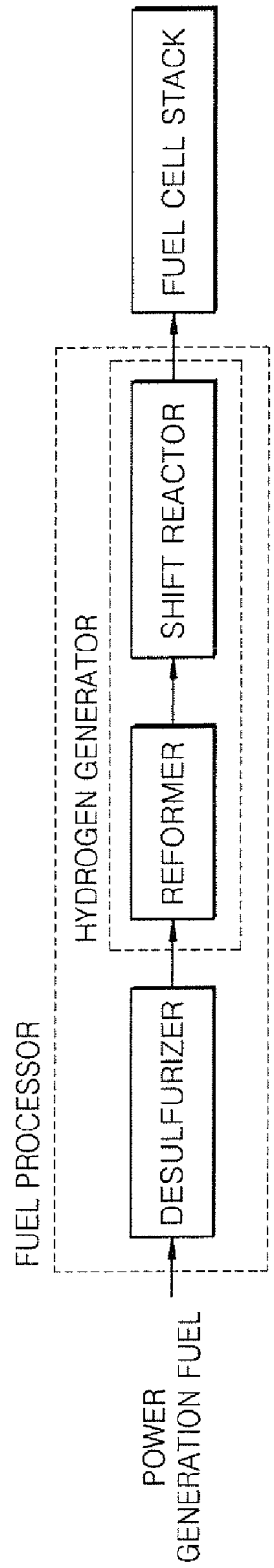
FIG. 1 is a block diagram showing a configuration of a conventional fuel cell system.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
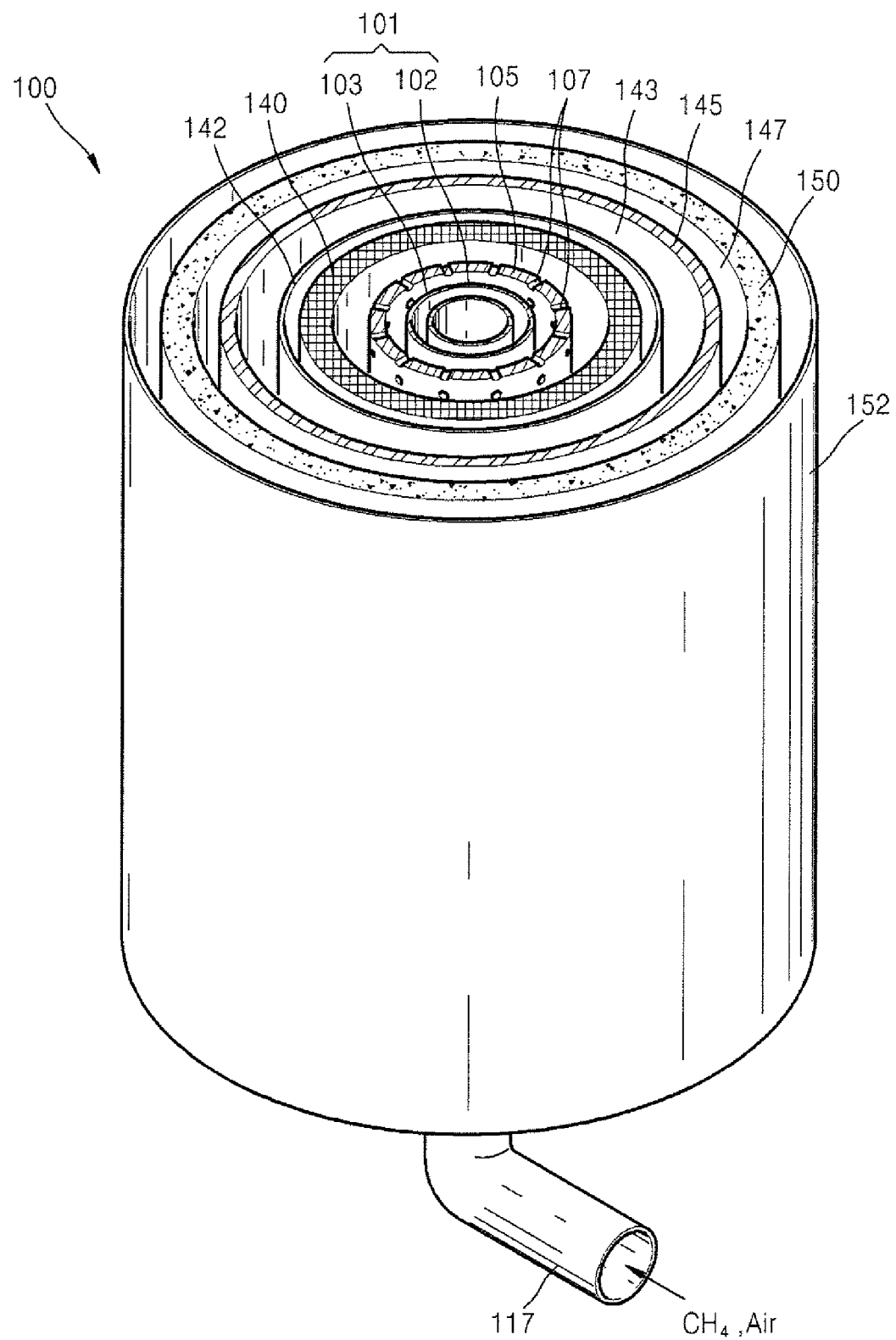
FIG. 2 is a cutaway perspective view illustrating a hydrogen generator, according to an embodiment of the present invention.
Figure 3:
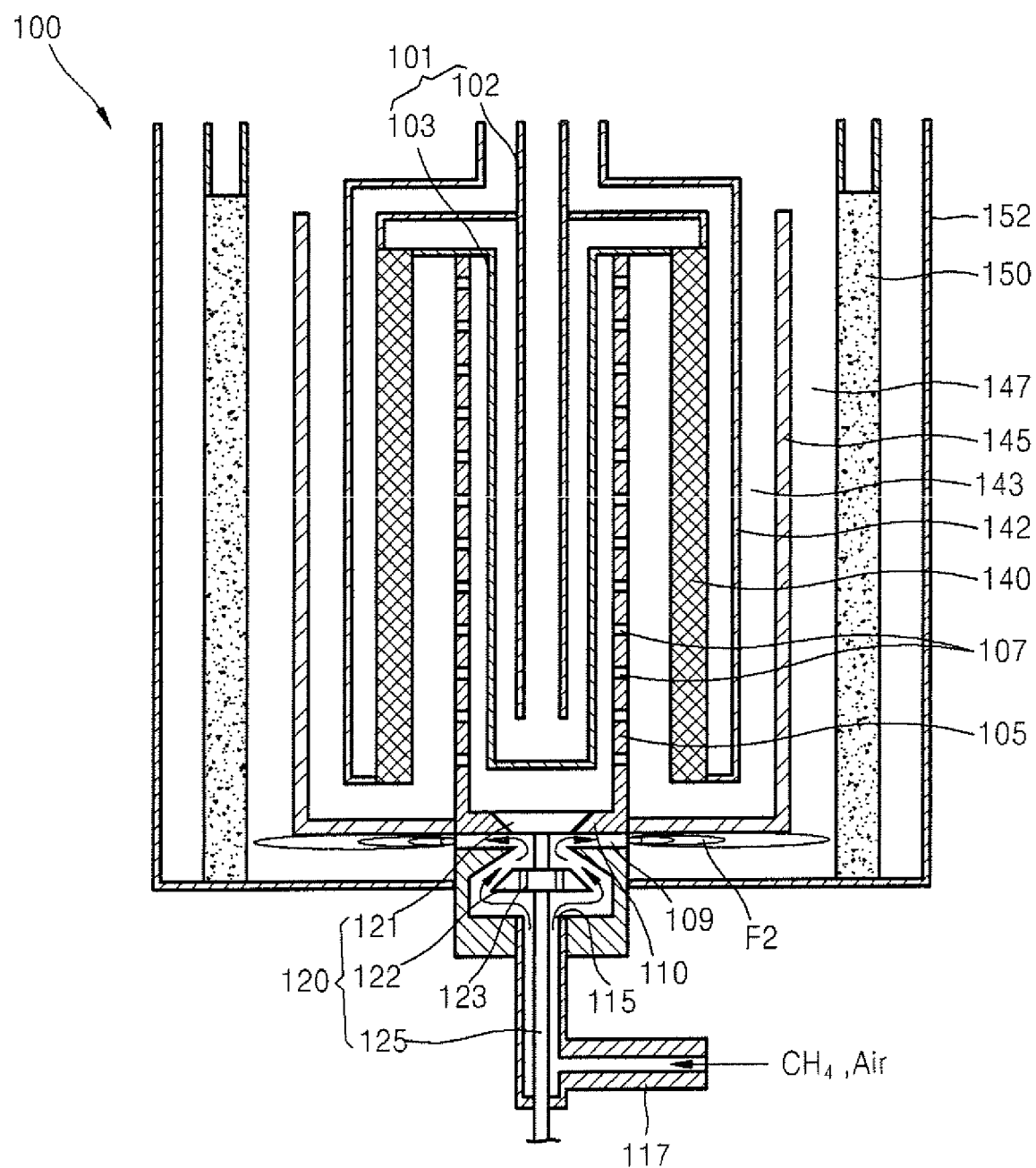
FIG. 3 is a cross-sectional view illustrating a hydrogen generator in which a shift catalyst is heated, according to an embodiment of the present invention.
Figure 4:
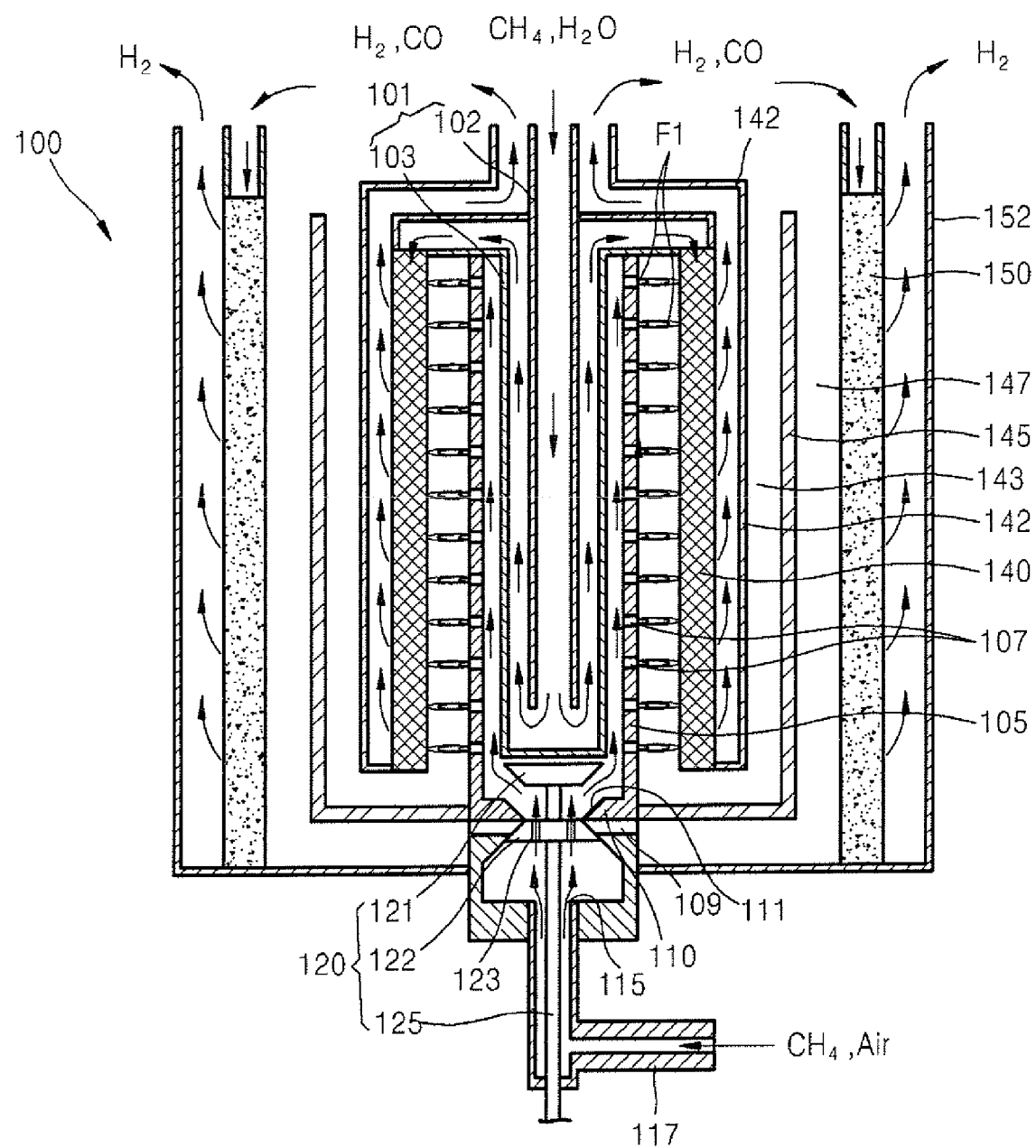
FIG. 4 is a cross-sectional view illustrating a hydrogen generator in which a reformer catalyst is heated, according to an embodiment of the present invention.
Figure 5:
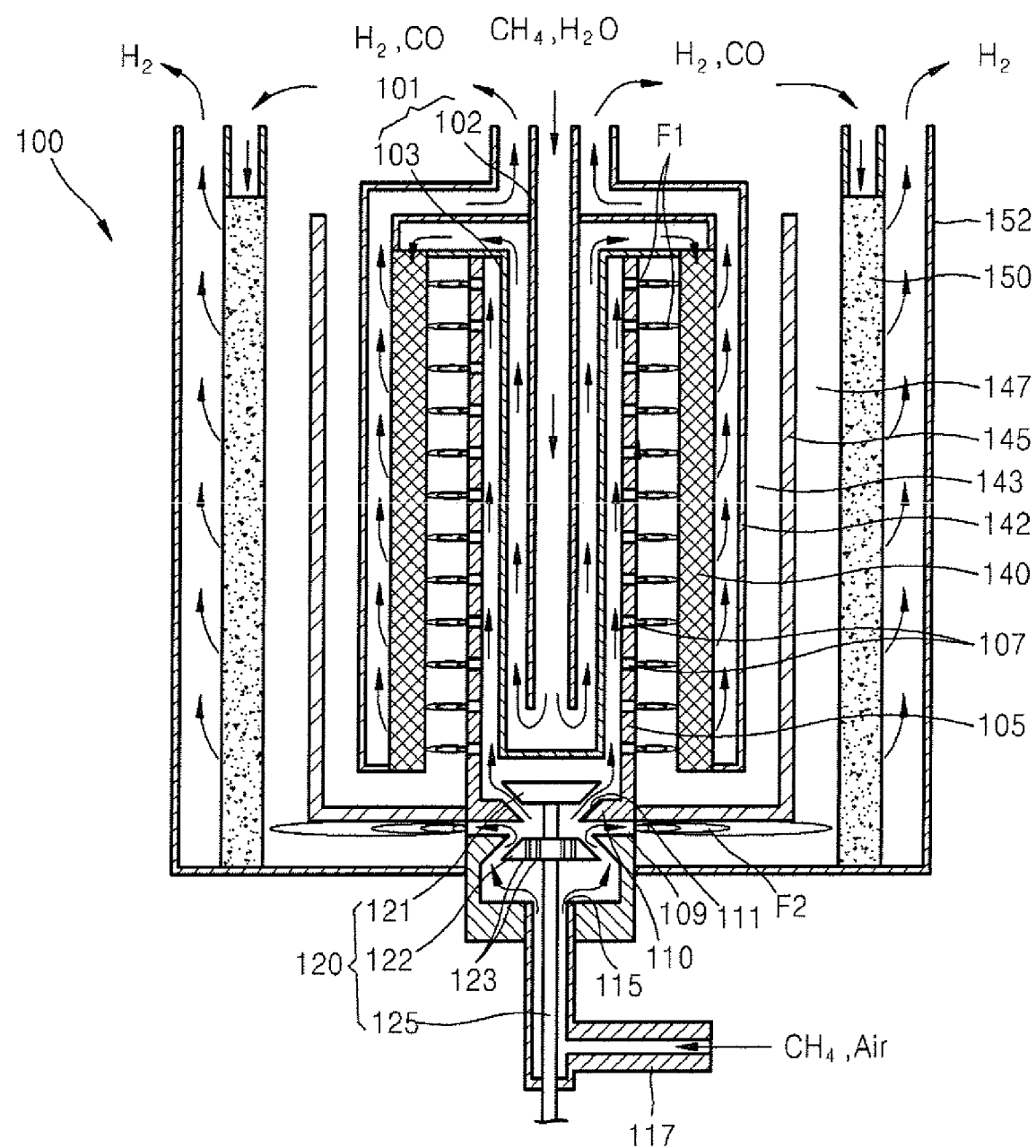
FIG. 5 is a cross-sectional view illustrating a hydrogen generator in which shift catalyst and reformer catalyst are simultaneously heated, according to an embodiment of the present invention.
Figure 6:
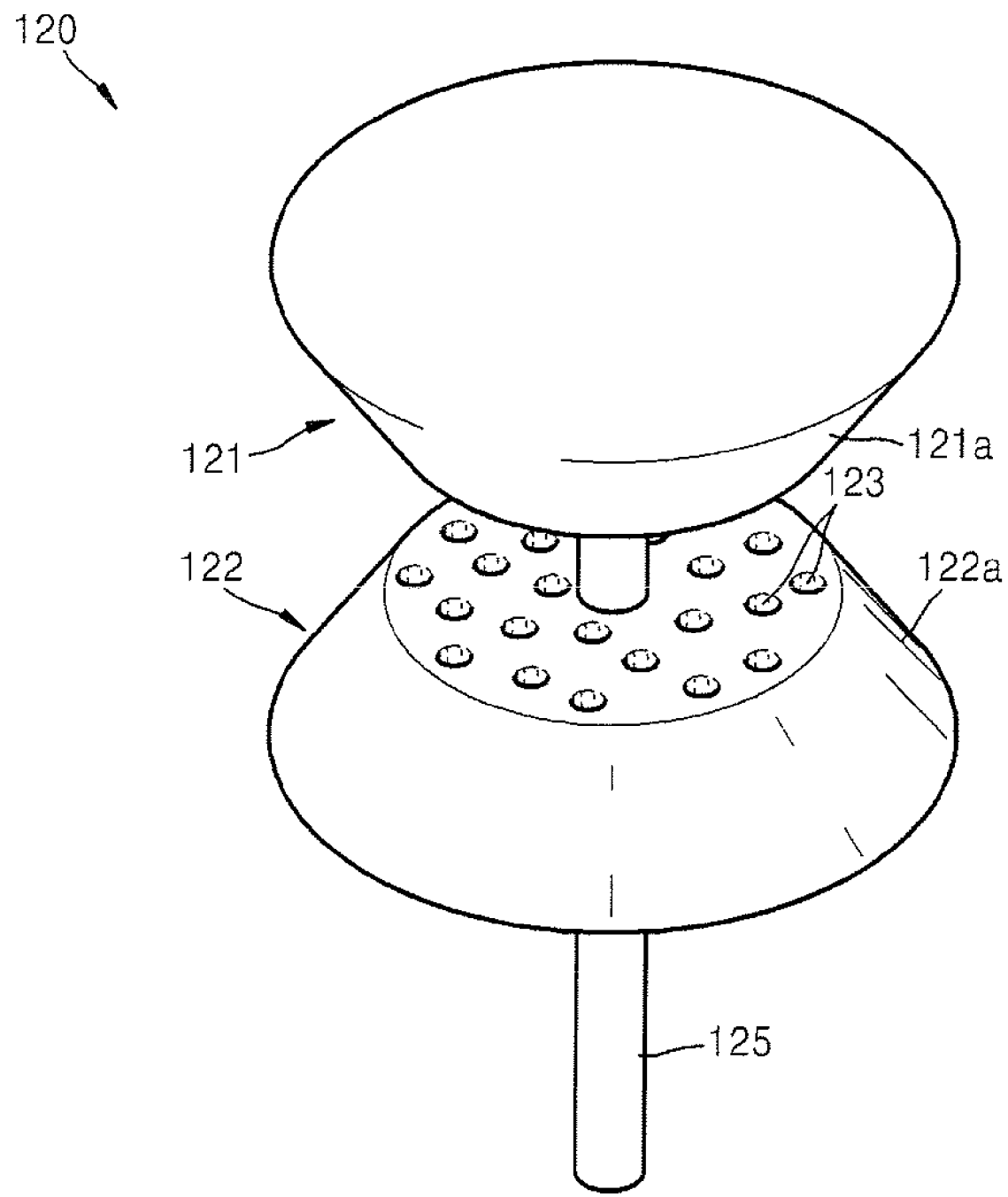
FIG. 6 is a perspective view illustrating a combustion fuel supply valve of FIGS. 3 through 5, according to an embodiment of the present invention.

FIG. 2 is a cutaway perspective view illustrating a hydrogen generator 100, according to an embodiment of the present invention. FIGS. 3 through 5 are cross-sectional views illustrating a hydrogen generator 100, according to an embodiment of the present invention, in which a shift catalyst is heated (FIG. 3), a reformer catalyst is heated (FIG. 4), and the shift catalyst and the reformer catalyst are simultaneously heated (FIG. 5). FIG. 6 is a perspective view illustrating a combustion fuel supply valve of FIGS. 3 through 5, according to an embodiment of the present invention.

Referring to FIGS. 2 through 5, the hydrogen generator 100 includes: a cylindrical reformer catalyst I 140; a cylindrical shift catalyst 150 disposed around the reformer catalyst 140; a cylinder 105 disposed inside of the reformer catalyst 140; and a separation wall 145 provided between the reformer catalyst 140 and the shift catalyst 150. The term cylindrical, as used herein, refers to a tube-like shape or a pipe-like shape.

The cylinder 105 is connected to a combustion fuel supply tube 117 to supply a combustion fuel comprising methane ($CH_4$) gas and air. The cylinder 105 includes a plurality of first nozzles 107 and a plurality of second nozzles 109, on the outer perimeter thereof. The second nozzles 109 are disposed at lower portions of the outer perimeter of the cylinder 105, and the first nozzles 107 are disposed at upper portions of the outer perimeter of the cylinder 105, relatively higher than the second nozzles 109.

All of the first nozzles 107 are separated a predetermined distance from the reformer catalyst 140, and face towards the reformer catalyst 140. Accordingly, when a plurality of first flames F1 are directed radially outward from the perimeter of cylinder 105 from the first nozzles 107, the first flames F1 heat up the reformer catalyst 140 by directly contacting the reformer catalyst 140. In some embodiments directly contacting comprises thermally contacting, for example, radiating thermal energy. An exhaust gas of the first flames F1 can be exhausted out of the hydrogen generator 100 through a first exhaust gas discharge path 143 formed on the inside of the separation wall 145.

The second nozzles 109 are configured to be separated from a lower end of the shift catalyst 150, and to face towards the shift catalyst 150. Accordingly, when a plurality of second flames F2 are directed radially outward from the perimeter of the cylinder 105 by the second nozzles 109, the second flames F2 heat up the shift catalyst 150 by contacting a lower end of the shift catalyst 150. Although the second flames F2 may not directly contact an upper portion of the shift catalyst 150, the shift catalyst 150 is heated by convection and conduction of heat from the second flames F2. An exhaust gas of the second flames F2 can be exhausted out of the hydrogen generator 100, through a second exhaust gas discharge path 147 formed on the outside of the separation wall 145.

The separation wall 145 is formed of an adiabatic material so that heat transfer between the reformer catalyst 140 and the shift catalyst 150 can be prevented. The adiabatic material can be any suitable insulating material that is resistant to heat transfer there through. The separation wall 145 is attached to the outer perimeter of the cylinder 105, between the first nozzles 107 and the second nozzles 109.

A combustion fuel supply hole 115, to direct a combustion fuel into the cylinder 105 through the combustion fuel supply tube 117, is formed on the inside of the bottom of the cylinder 105. The combustion fuel supply hole 115 is located relatively closer to the second nozzles 109 than to the first nozzles 107.

The cylinder 105 includes a combustion fuel supply valve 120 that selectively guides the combustion fuel supplied to the inside of the cylinder 105 towards the first nozzles 107 and/or the second nozzles 109.

Referring to FIG. 6, the combustion fuel supply valve 120 includes a shaft 125 and first and second blocks 121 and 122 which are connected to the shaft 125. The first and second blocks 121 and 122 are separated from each other, and the first block 121 is located above the second block 122.

The first and second blocks 121 and 122 respectively include slopes 121a and 122a which slant in opposite directions. A plurality of vertical through holes 123, that penetrate the upper and lower surfaces of the second block 122, are formed in the second block 122. The vertical through holes 123 provide a fluid communication between the upper and lower surfaces of the second block 122.

Referring again to FIGS. 3 through 5, a barrier wall 110, that separates the first nozzles 107 and the second nozzles 109, is formed in the cylinder 105. A first block seating hole 111, on which the first block 121 is seated, can be formed in the barrier wall 110. When the first block 121 is seated on the first block seating hole 111, the first block seating hole 111 is closed. Thus, the supply of the combustion fuel to the first nozzles 107 is blocked. The inner surface of the first block seating hole 111 includes a slope that corresponds to the slope 121a of the first block 121.

As depicted in FIG. 3, the fuel supply valve 120 is in a first position in which the supply of the combustion fuel to the first nozzles 107 is blocked by the first block 121. The second block 122 is sufficiently lowered so as not to block the second nozzles 109. Thus, the supply of the combustion fuel to the second nozzles 109 is allowed.

As depicted in FIG. 4, the fuel supply valve 120 is in a second position in which the supply of the combustion fuel to the second nozzles 109 is sealed, by the slope 122a (see FIG. 6) of the second block 122. The first block 121 is sufficiently raised so as not to block the first block seating hole 111. The combustion fuel that enters in the cylinder 105, through the combustion fuel supply hole 115, can be supplied to the first nozzles 107, via the through holes 123 of the second block 122 and the first block seating hole 111.

In FIG. 5, the fuel supply valve 120 is depicted in a third position in which the first block 121 does not block the first block seating hole 111, and the second block 122 does not block the second nozzles 109. The combustion fuel that enters the cylinder 105 through the combustion fuel supply hole 115 can be supplied to the first nozzles 107 and the second nozzles 109.

An inner heat exchanger 101, to evaporate water ($H_2O$) included in the power generation fuel using heat in the cylinder 105, is formed in the cylinder 105. The inner heat exchanger 101 includes: a power generation fuel guiding tube 102 that guides desulfurized power generation fuel into the cylinder 105; and a heat adsorption cylinder 103 surrounding the fuel guiding tube 102. Liquid water included in the power generation fuel is evaporated by heat absorbed from the outside of the heat adsorption cylinder 103. The inner heat exchanger 101 also prevents the inside of the cylinder 105 from overheating, thereby preventing the ignition of the combustion fuel within the cylinder 105.

A first hydrogen guide 142, to guide hydrogen ($H_2$), obtained from a power generation fuel, to the upper side of the hydrogen generator 100, is provided on the outside of the reformer catalyst 140. A second hydrogen guide 152, to guide hydrogen from which CO is removed to an upper side of the hydrogen generator 100, is provided on the outside of the shift catalyst 150. The hydrogen discharged through the first hydrogen guide 142 is supplied to the shift catalyst 150. The hydrogen discharged through the second hydrogen guide 152 is supplied to a fuel cell stack (not shown).

A method of operating the hydrogen generator 100, and a process of producing hydrogen using the hydrogen generator 100, will now be described in detail.

As depicted in FIG. 3, after the combustion fuel supply valve 120 is fixed in the first position, a combustion fuel, that includes methane ($CH_4$) and air, is supplied to the cylinder 105 via the combustion fuel supply tube 117. The combustion fuel is directed to a lower end of the shift catalyst 150 via the second nozzles 109. When the combustion fuel directed in this way is ignited, the second flames F2 heat up a shift catalyst 150.

Exhaust gas from the combustion is exhausted out of the hydrogen generator 100 through the second exhaust gas discharge path 147. As described above, in a shift reaction the CO content, in the hydrogen gas produced by the reform reaction, is reduced to 10 ppm or less, and the temperature of the shift reaction is approximately 200 to 250° C. The shift reaction is an endothermic reaction. Therefore, once the temperature reaches the shift reaction temperature, the shift reaction on the shift catalyst 150 can continue without further heating.

When the shift catalyst 150 reaches the reaction temperature, the combustion fuel supply valve 120 is moved to the second position, as depicted in FIG. 4. The combustion fuel is supplied to the upper part of the cylinder 105, through the vertical via holes 123 and the first block seating hole 111, and is directed to the reformer catalyst 140, via the first nozzles 107.

When the combustion fuel supplied in this way is ignited, the first flames F1 heat up the reformer catalyst 140. Exhaust gas from the first flames F1 is exhausted out of the hydrogen generator 100, via the first exhaust gas discharge path 143. Meanwhile, the second nozzles 109 are blocked by the second block 122, the second flames F2 (see FIG. 3) are extinguished, and the shift catalyst 150 is not heated.

The power generation fuel that contains methane ($CH_4$) and liquid water ($H_2O$), is supplied to the power generation fuel guiding tube 102 of the inner heat exchanger 101. The liquid water in the power generation fuel becomes water vapor, and the temperature of the methane increases from absorbing heat from the inside of the cylinder 105, while passing through the cylinder 105, thereby increasing the reactivity of the power generation fuel. The power generation fuel that is vaporized in this way is supplied to the heated reformer catalyst 140, where hydrogen ($H_2$), a small amount of CO, and other gases are produced. The produced hydrogen containing gas is discharged to the upper side of the hydrogen generator 100, via the first hydrogen guide 142, and is then supplied to the shift catalyst 150.

Meanwhile, the hydrogen ($H_2$) containing gas that is discharged through the first hydrogen guide 142, has a temperature of about 600° C., or more. However, the hydrogen containing gas is supplied to the shift catalyst 150 at a shift reaction temperature of about 200 to 250° C. Accordingly, although it is not shown, a heat exchanger for cooling the hydrogen containing gas can further be provided on a path that connects the first hydrogen guide 142 to the shift catalyst 150.

The hydrogen ($H_2$) containing gas that is supplied to the shift catalyst 150, is shift reacted to obtain a CO content of 10 ppm, or less, and is supplied to a fuel cell stack (not shown) via the second hydrogen guide 152.

As depicted in FIG. 5, the first flames F1 and the second flames F2 can be simultaneously formed at the first and second nozzles 107 and 109, by supplying the methane containing combustion fuel and air, via the combustion fuel supply tube 117, after the combustion fuel supply valve 120 is fixed in the third position. In this way, the reformer catalyst 140 and the shift catalyst 150 can both be heated to their respective reaction temperatures.

The reformer catalyst 140 and the shift catalyst 150 can reach their respective reaction temperatures at or nearly at the same time, when the supply of the combustion fuel to the first nozzles 107 and the second nozzles 109 is appropriately controlled using the position of the combustion fuel supply valve 120. Afterwards, as depicted in FIG. 4, when the power generation fuel is supplied through the combustion fuel guiding tube 102 after moving the combustion fuel supply valve 120 to the second position, hydrogen gas of high priority, can be obtained.

In a hydrogen generator and a method of operating the hydrogen generator according to aspects of the present invention, the temperature of a shift catalyst can be rapidly increased to a shift reaction temperature by directly heating the shift catalyst. Accordingly, the time required for a fuel cell system to start power generation can be reduced.

The reformer catalyst and the shift catalyst are compactly arranged, thereby reducing the volume of the fuel cell system.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A hydrogen generator, comprising:
   a reformer catalyst;
   a shift catalyst disposed around the reformer catalyst;
   a cylinder disposed inside of the reformer catalyst, the cylinder comprising,
      a plurality of first nozzles to direct a combustion fuel towards the reformer catalyst, and
      a plurality of second nozzles to direct a combustion fuel towards the shift catalyst;
   a separation wall disposed between the reformer catalyst and the shift catalyst such that the combustion fuel directed by the first nozzles is not directed to the shift catalyst and the combustion fuel directed by the second nozzles is not directed to the reformer catalyst, and
   a combustion fuel supply valve to selectively guide the combustion fuel to only the first nozzles and not to the second nozzles, to only the second nozzles and not to the first nozzles, or to both the first and second nozzles.

2. The hydrogen generator of claim 1, wherein the separation wall is formed of an insulating material.

3. The hydrogen generator of claim 1, wherein the cylinder has a combustion fuel supply hole defined therein, to direct the combustion fuel into the cylinder,
   wherein the combustion fuel supply hole is located closer to the second nozzles than the first nozzles, and
   wherein the combustion fuel supply valve is disposed between the first nozzles and the second nozzles within the cylinder.

4. The hydrogen generator of claim 3, wherein the combustion fuel supply valve comprises:
   a first block to block the combustion fuel from being supplied to the first nozzles;
   a second block to block the combustion fuel from being supplied to the second nozzles; and
   a shaft connecting the first block and the second block,
   wherein the combustion fuel supply valve is configured to move to a first position in which the supply of the combustion fuel to the first nozzles is blocked by the first block but the supply of the combustion fuel to the second nozzles is allowed, a second position in which the supply of the combustion fuel to the second nozzles is blocked by the second block but the supply of the combustion fuel to the first nozzles is allowed, and a third position in which the supply of the combustion fuel to both the first nozzles and the second nozzles is allowed.

5. The hydrogen generator of claim 1, further comprising an inner heat exchanger disposed in the cylinder, to vaporize water added to a power generation fuel.

6. The hydrogen generator of claim 1, wherein the reformer catalyst directly opposes the first nozzles.

7. The hydrogen generator of claim 1, wherein:
   the second nozzles are disposed on a second portion of the outer perimeter of the cylinder, adjacent to the combustion fuel supply valve; and
   the first nozzles are disposed on a first portion of the outer perimeter of the cylinder, adjacent to the reformer catalyst.

8. The hydrogen generator of claim 5, wherein the heat exchanger comprises:
   a fuel guiding tube to guide a power generating fuel to the cylinder; and
   a heat absorption cylinder to vaporize the water.

9. The hydrogen generator of claim 1, wherein the combustion fuel supply valve comprises:
   a first block to block the combustion fuel from being supplied to the first nozzles;
   a second block to block the combustion fuel from being supplied to the second nozzles; and
   a shaft connecting the first block and the second block,
   wherein the second block comprises a first surface, a second surface, and plurality of through holes to connect the first surface and the second surface.

10. The hydrogen generator of claim 1, wherein the combustion fuel supply valve comprises:
    a first block to block the combustion fuel from being supplied to the first nozzles;
    a second block to block the combustion fuel from being supplied to the second nozzles; and
    a shaft connecting the first block and the second block,
    wherein the combustion fuel supply valve is configured to move along an axis running though the shaft.

11. The hydrogen generator of claim 1, further comprising a first hydrogen guide to direct the flow of hydrogen from the reformer catalyst to the shift catalyst.

12. The hydrogen generator of claim 1, further comprising a second hydrogen guide to direct the flow of hydrogen from the shift catalyst out of the hydrogen generator.

13. The hydrogen generator of claim 1, further comprising:
    a first exhaust gas discharge path; and
    a second exhaust gas discharge path,
    wherein the first exhaust gas discharge path and second exhaust gas discharge path are configured to channel exhaust gas from the first nozzles and the second nozzles, respectively, out of the hydrogen generator.

14. A hydrogen generator, comprising:
    a reformer catalyst;
    a shift catalyst disposed around the reformer catalyst;
    a burner disposed inside of the reformer catalyst, the burner comprising,
       a plurality of first nozzles that direct flames toward the reformer catalyst, and
       a plurality of second nozzles that direct flames toward the shift catalyst;
    a separation wall disposed between the reformer catalyst and the shift catalyst such that the flames directed by the first nozzles are not directed to the shift catalyst and the flames directed by the second nozzles are not directed to the reformer catalyst; and
    a combustion fuel supply valve to selectively guide a combustion fuel to only the first nozzles and not to the second nozzles, to only the second nozzles and not to the first nozzles, or to both the first and second nozzles.

15. A hydrogen generator comprising:

a reformer catalyst;

a shift catalyst disposed around the reformer catalyst;

a separation wall disposed between the reformer catalyst and the shift catalyst;

a cylinder disposed inside of the reformer catalyst, comprising, a plurality of first nozzles to direct a combustion fuel towards the reformer catalyst, and a plurality of second nozzles to direct a combustion fuel towards the shift catalyst; and a combustion fuel supply valve to selectively guide a combustion fuel to the first nozzles, the second nozzles, or both the first and second nozzles, wherein the combustion fuel supply valve comprises:

a first block to block the combustion fuel from being supplied to the first nozzles;

a second block to block the combustion fuel from being supplied to the second nozzles; and a shaft connecting the first block and the second block, wherein the second block comprises a first surface, a second surface, and plurality of through holes to connect the first surface and the second surface.

\* \* \* \* \*